US012246957B2

(12) United States Patent
Song et al.

(10) Patent No.: US 12,246,957 B2
(45) Date of Patent: Mar. 11, 2025

(54) MOVEMENT BUFFERING CONTROL SYSTEM AND METHOD FOR FORKLIFT TILT CYLINDER BASED ON ANGLE COMPENSATION

(71) Applicant: ANHUI HELI CO., LTD., Anhui (CN)

(72) Inventors: Qiang Song, Anhui (CN); Xuesong Yang, Anhui (CN); Tao Xu, Anhui (CN); Falu Wang, Anhui (CN); Zhenjian Xue, Anhui (CN)

(73) Assignee: ANHUI HELI CO., LTD., Anhui (CN)

( * ) Notice: Subject to any disclaimer, the term of this patent is extended or adjusted under 35 U.S.C. 154(b) by 308 days.

(21) Appl. No.: 17/797,729

(22) PCT Filed: May 26, 2021

(86) PCT No.: PCT/CN2021/096137

§ 371 (c)(1),
(2) Date: Aug. 5, 2022

(87) PCT Pub. No.: WO2022/077913

PCT Pub. Date: Apr. 21, 2022

(65) Prior Publication Data

US 2023/0072784 A1 Mar. 9, 2023

(30) Foreign Application Priority Data

Oct. 13, 2020 (CN) ......................... 202011091107.3

(51) Int. Cl.
*B66F 9/22* (2006.01)
*B66F 9/075* (2006.01)
(Continued)

(52) U.S. Cl.
CPC .............. *B66F 9/22* (2013.01); *B66F 9/0755* (2013.01); *B66F 9/082* (2013.01); *F15B 13/02* (2013.01); *F15B 15/16* (2013.01)

(58) Field of Classification Search
CPC .......... B66F 9/22; B66F 9/0755; B66F 9/082; B66F 17/003; F15B 13/02; F15B 15/16; F15B 11/16
See application file for complete search history.

(56) References Cited

U.S. PATENT DOCUMENTS 6,056,501 A * 5/2000 Ishikawa ............... B66F 9/0755 280/124.112
6,611,746 B1 * 8/2003 Nagai ................... B66F 9/0755 187/222

(Continued)

FOREIGN PATENT DOCUMENTS

CN 106986289 7/2017
CN 108298481 7/2018

(Continued)

OTHER PUBLICATIONS

Translation for JP_2011125956_A (Year: 2011).*

(Continued)

*Primary Examiner* — Adam R Mott
*Assistant Examiner* — Ricardo I Viscarra
(74) *Attorney, Agent, or Firm* — JCIPRNET

(57) ABSTRACT

The present application provides a movement buffering control system and method for forklift tilt cylinder based on angle compensation in the field of forklift control, which includes a tilt cylinder configured to control forward and backward tilting of a mast of a forklift and a lift cylinder configured to control the lifting of a fork, and further includes a controller, wherein a signal input terminal of the controller is connected to a first angle sensor to measure a tilt angle of the mast relative to a vertical plane, a second angle sensor to measure a tilt angle of a vehicle body relative to a level ground, and a pressure sensor, and wherein a signal output terminal of the controller is connected to a display, a (Continued)

forward-tilting proportional valve to control the oil for forward-tilting of the tilt cylinder.

3 Claims, 5 Drawing Sheets

(51) Int. Cl.
*B66F 9/08* (2006.01)
*F15B 13/02* (2006.01)
*F15B 15/16* (2006.01)

(56) References Cited

U.S. PATENT DOCUMENTS

| | | | | |
|---|---|---|---|---|
| 2016/0083233 | A1* | 3/2016 | Yamada | B66F 17/003<br>414/664 |
| 2016/0101970 | A1* | 4/2016 | Taki | B66F 17/003<br>701/50 |
| 2017/0043988 | A1* | 2/2017 | Lee | B66F 9/22 |
| 2017/0072562 | A1* | 3/2017 | Kokubo | B25J 9/1638 |

FOREIGN PATENT DOCUMENTS

| | | | |
|---|---|---|---|
| CN | 208037958 | | 11/2018 |
| CN | 109694020 | | 4/2019 |
| CN | 112249984 | | 1/2021 |
| EP | 2128078 | | 12/2009 |
| JP | 2000038299 | | 2/2000 |
| JP | 2011125956 | A * | 6/2011 |
| WO | 0160734 | | 8/2001 |

OTHER PUBLICATIONS

"Search Report of Europe Counterpart Application", issued on Nov. 6, 2023, pp. 1-7.

"International Search Report (Form PCT/ISA/210) of PCT/CN2021/096137", mailed on Jul. 27, 2021, with English translation thereof, pp. 1-4.

"Written Opinion of the International Searching Authority (Form PCT/ISA/237) of PCT/ CN2021/096137", mailed on Jul. 27, 2021, pp. 1-5.

* cited by examiner

MOVEMENT BUFFERING CONTROL SYSTEM AND METHOD FOR FORKLIFT TILT CYLINDER BASED ON ANGLE COMPENSATION

CROSS-REFERENCE TO RELATED APPLICATION

This application is a 371 of international application of PCT application serial no. PCT/CN2021/096137, filed on May 26, 2021, which claims the priority benefit of China application serial no. 202011091107.3, filed on Oct. 13, 2020. The entirety of each of the above-mentioned patent applications is hereby incorporated by reference herein and made a part of this specification.

BACKGROUND

Technical Field

The present invention relates to the field of forklift control, and in particular, to a movement buffering control system and method for forklift tilt cylinder based on angle compensation.

Description of Related Art

As shown in FIG. 1, a forklift realizes forward and backward tilting movement of a mast and a fork through the movement of a tilt cylinder, so as to reach forward- and backward-tilting design angles. When a limit position of movement is reached, if speed and angle positions cannot be effectively controlled, structural parts are prone to be impacted; or alternatively, when the limit position is reached, if the tilt cylinder is still controlled to move, an engine is prone to be stalled. Therefore, at present, when forward-tilting movement and backward-tilting movement are close to a maximum angle, the movement of the forklift is generally controlled by introducing buffering control means.

At present, there are two manners to achieve buffering. In one manner, buffering is achieved by adding a special cylinder buffering arrangement. In this manner, when the load is relatively large, the effect is not remarkable, and the buffering by means of throttling may cause the temperature of hydraulic oil to rise, which may affect normal operation of the hydraulic system.

In the other manner, buffering is achieved by controlling a tilt angle and a speed through a special electric control system. More specifically, an angle sensor is specifically configured to measure a tilt angle of the mast. When a preset angle is reached, it performs a deceleration ahead of time, until the maximum angle is reached and the speed decreases to 0. However, because only one angle sensor is installed and only one angle value participates in the control, this manner can only achieve effective buffering in some cases, and involves the following problems.

Firstly, uneven ground, abnormal tire pressure or operation on the slope and the like may cause the tilt angle of the mast of the forklift relative to the vehicle body to be different from the tilt angle of the mast relative to the ground. Once this happens, if only a single angle sensor installed to the mast performs a signal acquisition to carry out a buffering control process, the tilt cylinder may stop moving in advance before the mast reaches a designed maximum tilt angle in one direction; while in another direction, although the limit position has been reached, the proportional valve to control the movement of the cylinder has not been switched off (when an angle deviation is relatively large, a deceleration has not even achieved), which may cause a strong impact on the structure.

Secondly, the influence on the tilt angle of the mast caused by deformation of the mast due to load is not considered, whereas, especially for a heavy forklift, when the load is fairly large or full, the mast may be deformed to some extent. The failure to distinguish preset values for buffering (angle values at which deceleration starts and movement stops) between no load and heavy load results in the situations mentioned in the first problem under some working conditions, that is, it (the tilt cylinder) stops moving in advance before the mast reaches the designed maximum tilt angle in one direction, in which case a maximum design value of the tilt angle cannot be reached even though buffering exists; and in the other direction, the limit position has been reached, but the proportional valve has not been switched off, which fails to realize buffering and then causes an impact on the structure.

SUMMARY

Technical Problem

An objective of the present invention is to provide a movement buffering control system and method for forklift tilt cylinder based on angle compensation, so as to solve the problems raised above in the Technical Background.

Solution to Problem

In order to achieve the above objective, the present invention provides the following technical solution.

A movement buffering control method for forklift tilt cylinder based on angle compensation, including the following steps:

- step 1: when a forklift is non-loaded on a level ground, a telescopic position of a tilt cylinder, corresponding to a vertical mast, being a neutral position of the cylinder, acquiring a limit forward-tilting angle B and a limit backward-tilting angle C of the mast tilted forward and backward from a vertical state;
- step 2: on the level ground, measuring and acquiring, by using a control variable method (Method of Control Variates), a plurality of groups of mast deformation angles $\gamma$ caused by load, and statistically calculating a corresponding relationship between load weights and $\gamma$;
- step 3: when the forklift operates, acquiring a current tilt angle $\alpha$ of the mast relative to a vertical plane, a current tilt angle $\beta$ of a vehicle body relative to the level ground and a current load weight on a fork in real time when the vehicle body operates on the ground;
- step 4: calculating a tilt angle A of a current actual position of the mast with respect to the actual position of the mast currently corresponding to the neutral position of the cylinder in real time, $A=\alpha-\beta-\gamma$;
- step 5: presetting a mast forward-tilting deceleration angle B1 and a mast backward-tilting deceleration angle C1, and judging whether the forklift is tilting forward or tilting backward: when the forklift is tilting forward, performing step 6; and when the forklift is tilting backward, performing step 7;
- step 6: comparing A, B and B1, when A=B1, a forward-tilting proportional valve in the forklift being controlled to reduce an amount of oil supplied to the tilt cylinder;

and when A=B, the forward-tilting proportional valve cutting off an oil supply path to the tilt cylinder; and step 7: comparing A, C and C1, when A=C1, a backward-tilting proportional valve in the forklift being controlled to reduce an amount of oil supplied to the tilt cylinder; and when A=C, the backward-tilting proportional valve cutting off an oil supply path to the tilt cylinder.

As an improved solution according to the present invention, the mast forward-tilting deceleration angle B1 is smaller than the limit forward-tilting angle B by 1° to 2°.

As an improved solution according to the present invention, the mast backward-tilting deceleration angle C1 is smaller than the limit backward-tilting angle C by 1° to 2°.

A movement buffering control system for forklift tilt cylinder based on angle compensation, including a tilt cylinder configured to control forward and backward tilting of a mast of a forklift and a lift cylinder configured to control the lifting of a fork, and further including a controller, wherein a signal input terminal of the controller is connected to a first angle sensor to measure a tilt angle of the mast relative to a vertical plane, a second angle sensor to measure a tilt angle of a vehicle body relative to a level ground and a pressure sensor to measure a load weight on the fork, and wherein a signal output terminal of the controller is connected to a display to preset a mast forward-tilting deceleration angle and a mast backward-tilting deceleration angle, a forward-tilting proportional valve to control the oil for forward-tilting of the tilt cylinder, a backward-tilting proportional valve to control the oil for backward-tilting of the tilt cylinder and a lift solenoid valve to control the oil for lifting of the lift cylinder.

Effects of Invention

Beneficial effects are as follows. The present invention provides a tilt movement buffering control system and method based on angle compensation, which, through construction of the control system and angle compensation, can effectively compensate for angle deviations between the mast on one hand and the vehicle body and the ground on the other hand caused by the deformation of the mast due to the load or by the unevenness of the ground and the like. With the setting of the deceleration angle, when the preset angle is reached, deceleration starts, and until the limit position is reached, the movement stops as the speed decreases to 0, so as to realize precise control over tilt movement buffering, which can not only realize the buffering but also make the mast reach positions of the designed limit angles of forward-tilting and backward-tilting relative to the vehicle body, thereby meeting use requirements in various working sites and working conditions.

Figure 1:
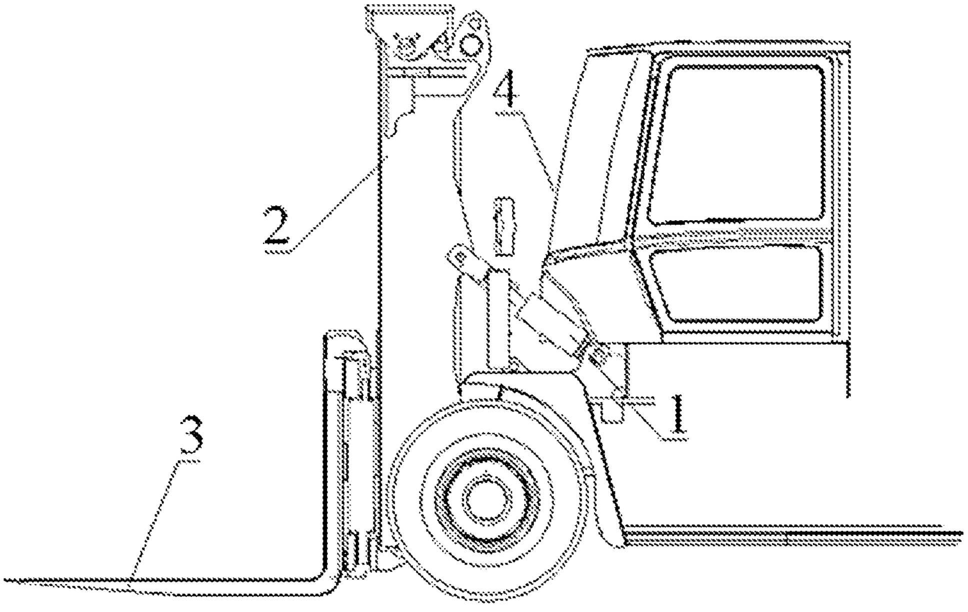
FIG. 1 is a schematic structural diagram of a forklift in the prior art.

In the drawings, 1: tilt cylinder; 2: mast; 3: fork; 4: vehicle body.

DESCRIPTION OF THE EMBODIMENTS

The technical solutions according to the embodiments of the present invention will be described clearly and completely below with reference to the accompanying drawings in the embodiments of the present invention. Apparently, the described embodiments are merely some of rather than all of the embodiments of the present invention. All other embodiments acquired by those of ordinary skill in the art without creative efforts based on the embodiments of the present invention shall fall within the protection scope of the present application.

Figure 2:
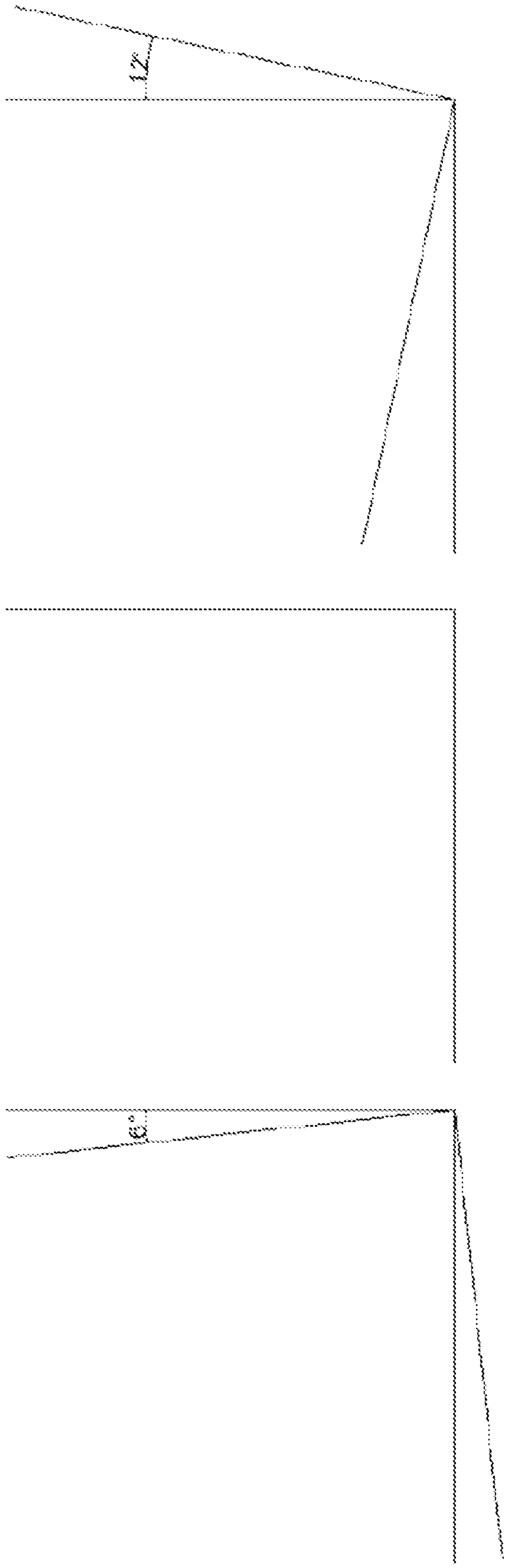
FIG. 2 is a schematic diagram of mast forward-tilting, mast in vertical and mast backward-tilting angles of a forklift.

As shown in FIG. 2, when the ground is level and the forklift is non-loaded, on the left is a limit forward-tilting angle B measured by an angle sensor when the mast tilts forward from a vertical state, which also corresponds to a maximum forward entending position of the tilt cylinder; in the middle is a telescopic position of the tilt cylinder when the mast is in the vertical state, which is called a neutral position of the cylinder; on the right is a limit backward-tilting angle C when the mast tilts backward from the vertical state, which also corresponds to a maximum backward extending position of the tilt cylinder. In order to make full and efficient use of the forklift, the tilt cylinder may be required to reach the maximum forward or backward extending position, regardless of whether the road surface is even or not.

When the mast or vehicle body tilts forward relative to the level ground, "+" represents a forward-tilting direction, and when the mast or vehicle body tilts backward, "−" represents a backward-tilting direction. In order to prevent the impact on the structural parts when the mast tilts to the limit, a buffering angle is set. When the buffering angle is reached, deceleration starts, and the movement speed decreases to 0 when reaching a limit forward-tilting angle or a limit backward-tilting angle.

Taking B=6° as an example, ideally, it is assumed that deceleration starts upon a forward tilt of 5° measured by the angle sensor, and the speed decreases to 0 when tilting forward to 6° measured by the angle sensor; taking C=−12° as an example, ideally, it is assumed that deceleration starts upon a backward tilt of −11° measured by the angle sensor, and the speed decreases to 0 when tilting backward to −12° measured by the angle sensor, so as to realize forward and backward tilt movement buffering.

Figure 3:
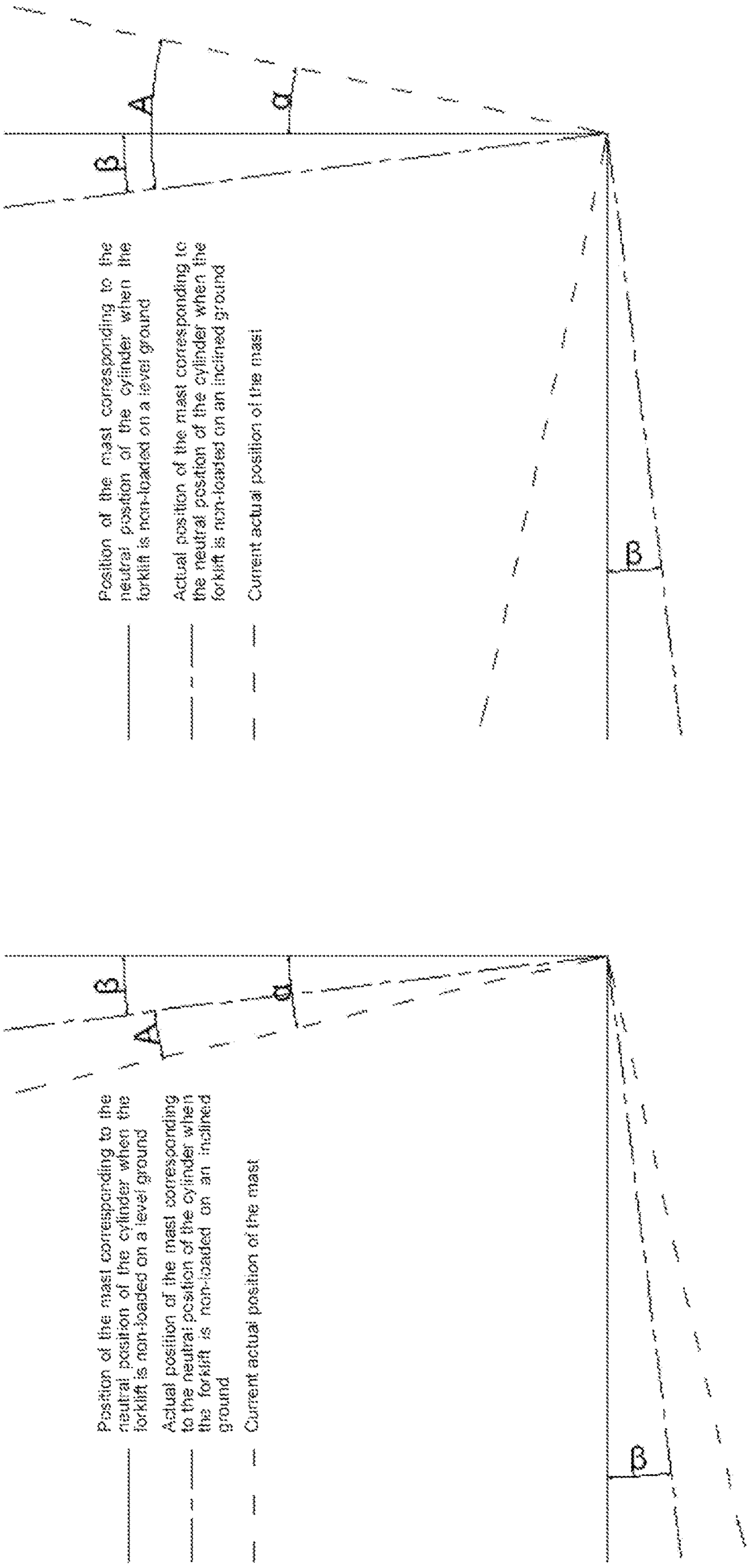
FIG. 3 is a schematic diagrams of forward-tilting and backward-tilting angles when the ground is inclined and the forklift is non-loaded.

As shown in FIG. 3, when the forklift is non-loaded and the ground is non-level, an angle $\beta$ exists between the vehicle body and a level ground in a front-back direction, and an angle of the mast relative to a vertical plane (namely the position of the mast corresponding to the neutral position of the cylinder when the forklift is non-loaded on a level ground) measured by the angle sensor is $\alpha$. A tilt angle of a current actual position of the mast relative to the actual position of the mast corresponding to the neutral position of the cylinder on the inclined ground is denoted as A.

Assuming that $\beta$=1°, a buffering angle is also set for buffering. In FIG. 3, on the left is a forward-tilted state of the forklift. In this case, the mast of the forklift starts to decelerate when moving to a position where the angle sensor measures $\alpha$=5°, and the speed should decrease to 0 when $\alpha$=6°. However, the vehicle body tilts by 1°, that is, the actual position of the mast corresponding to the neutral position of the cylinder is not in a vertical state, but tilts by 1°. Therefore, when the angle sensor measures $\alpha$=5°, the angle of a current actual position of the mast relative to the actual position of the mast corresponding to the neutral position of the cylinder is $A=\alpha-\beta=4°$, and deceleration starts when the mast has not reached the set buffering angle. When $\alpha=6°$, $A=\alpha-\beta=5°$, and the speed of the forklift decreases to 0 while the maximum forward extending position of the tilt cylinder has not been reached.

Similarly, on the right of FIG. 3 is a backward-tilted state of the forklift. When the angle sensor measures $\alpha=-11°$, the forklift should start to decelerate, but the angle between a current actual position of the mast and the actual position of the mast corresponding to the neutral position of the cylinder is $A=-(-\alpha+\beta)=-12°$. In this case, the tilt cylinder has actually reached the maximum backward extending position. When $\alpha=-12°$, $A=-13°$, the movement of the forklift has already caused impact on the structural parts, without achieving a buffering effect.

Figure 4:
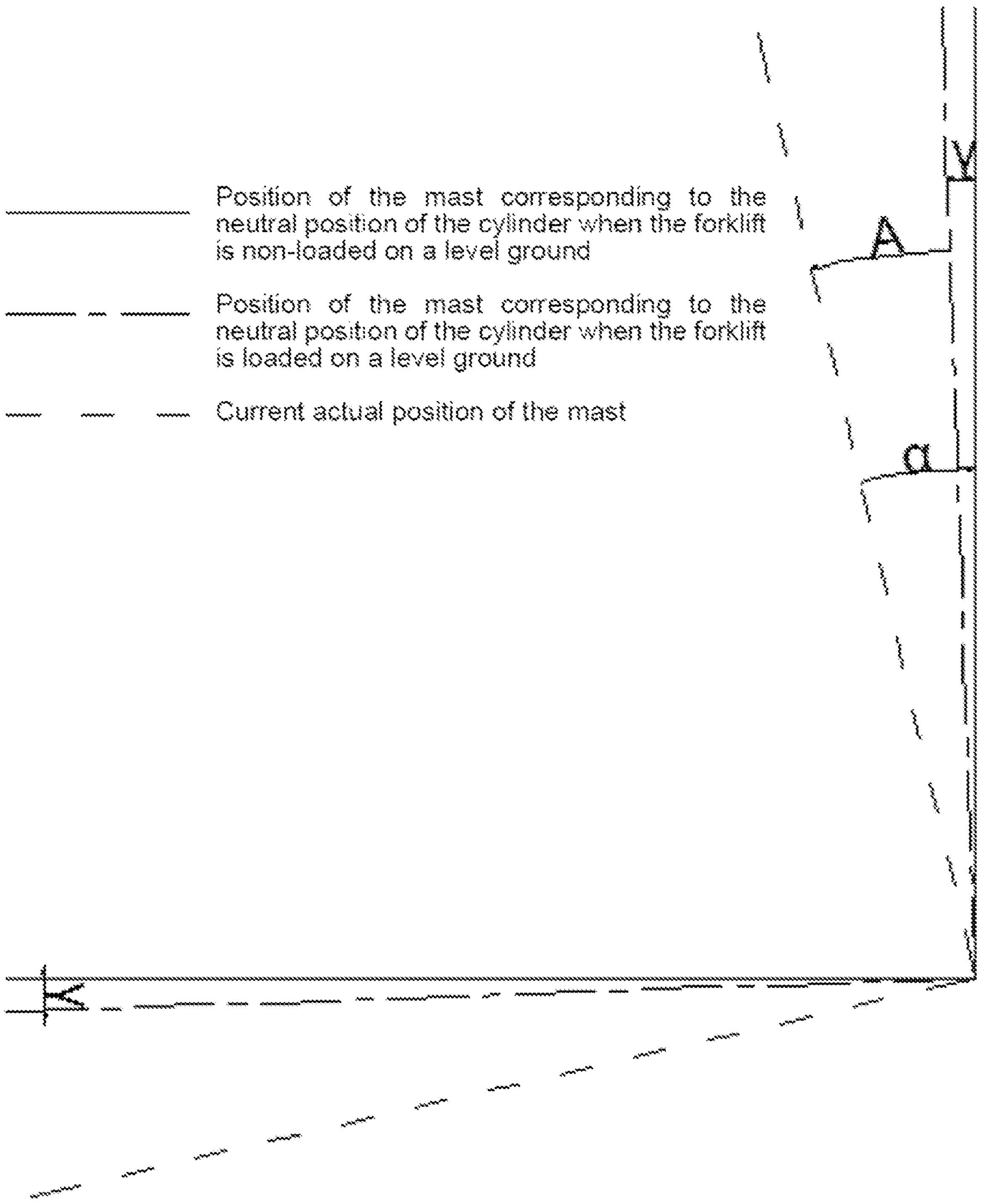
FIG. 4 is a schematic diagram of angles when the ground is level and the forklift is heavily loaded.

As shown in FIG. 4, when the ground is level but the mast is deformed by a load, a deformation angle of the mast is assumed to be $\gamma$. The value of $\gamma$ is actually a difference between angles of the mast relative to a vertical plane under heavy load and no load in the case of same ground flatness, tire pressure and telescopic length of the tilt cylinder.

In the case of forward-tilting movement, ideally, deceleration starts when $\alpha=5°$, and the speed decreases to 0 when $\alpha=6°$. Assuming that the deformation angle of the mast caused by heavy load is $\gamma=0.2°$, $A=\alpha-\gamma$. When $\alpha$ is 5°, $A=--\gamma=4.8°$. When $\alpha$ is 6°, $A=\alpha-\gamma=5.8°$. As a result, the telescopic cylinder stops moving without reaching the maximum forward extending position. Although it has played a certain buffering effect, the range of forward-tilting movement is reduced, thus the buffering effect is not as good as expected, and the greater the deformation, the more notable the influence.

A movement buffering control system for forklift tilt cylinder according to this embodiment includes a tilt cylinder configured to control forward and backward tilting of a mast of a forklift and a lift cylinder configured to control the lifting of a fork, and further includes a controller, wherein a signal input terminal of the controller is connected to a first angle sensor to measure a tilt angle of the mast relative to a vertical plane, a second angle sensor to measure a tilt angle of the vehicle body relative to a level ground and a pressure sensor to measure a load weight on the fork. The controller further reads a signal from a handle of the forklift. A signal output terminal of the controller is connected to a display to preset a mast forward-tilting deceleration angle and a mast backward-tilting deceleration angle, a forward-tilting proportional valve to control the oil for forward-tilting of the tilt cylinder, a backward-tilting proportional valve to control the oil for backward-tilting of the tilt cylinder and a lift solenoid valve to control the oil for lifting of the lift cylinder.

This embodiment further provides a movement buffering control method for forklift tilt cylinder, including the following steps.

In step 1, when a forklift is non-loaded on a level ground, a telescopic position of a tilt cylinder, corresponding to a vertical mast, refers to a neutral position of the cylinder, a limit forward-tilting angle B (a maximum forward extending position of the tilt cylinder) and a limit backward-tilting angle C (a maximum backward extending position of the tilt cylinder) of the mast, to be tilted forward and backward from a vertical state, are acquired.

In step 2, on the level ground, a plurality of groups of mast deformation angles $\gamma$ caused by load are measured and acquired by using a control variable method, and a corresponding relationship between load weights and $\gamma$ is statistically calculated.

Specifically, in this step, $\gamma$ may be obtained by a load test, in which the position of the mast is adjusted in the case of level ground and same tire pressure and no load, so that the tilt cylinder is located at the neutral position of the cylinder, the mast tilt angle $\alpha=0$; and then the forklift is controlled to shovel and carry different tonnage of heavy objects. The pressure sensor is mounted on the lift cylinder or the lift solenoid valve. Load pressures are read by the pressure sensor. When the tilt cylinder is at the neutral position of the cylinder after loading, the measured value of the first angle sensor is $\gamma$. The pressure sensor collects loads of different tonnages, to obtain different pressure values and corresponding $\gamma$, and writes the pressure values generated by the loads and the deformation amounts of the mast into the controller.

In step 3, when the forklift operates, a current tilt angle $\alpha$ of the mast relative to a vertical plane, a current tilt angle $\beta$ of the vehicle body relative to the level ground and a current load weight on the fork are acquired in real time when the vehicle body operates on the ground.

According to the current load weight on the fork and the corresponding relationship between load weights (pressure values) and $\gamma$ measured in step 2, the currently relevant deformation angle $\gamma$ of the mast is obtained.

In step 4, a tilt angle A of a current actual position of the mast with respect to the actual position of the mast currently corresponding to the neutral position of the cylinder is calculated in real time, that is, $A=\alpha-\beta-\gamma$.

In step 5, a mast forward-tilting deceleration angle B1 and a mast backward-tilting deceleration angle C1 are preset through a display, and the controller judges, by reading angle values of the first angle sensor and the second angle sensor, whether the forklift is tilting forward or tilting backward: when the forklift is tilting forward, step 6 is performed; and when the forklift is tilting backward, step 7 is performed.

In step 6, A, B and B1 are compared, and when A=B1, a forward-tilting proportional valve in the forklift is controlled to reduce an amount of oil supplied to the tilt cylinder, and the forklift starts to decelerate; and when A=B, the tilt cylinder reaches a maximum forward extending position, and the forward-tilting proportional valve cuts off an oil supply path to the tilt cylinder, and the speed of the forklift decreases to 0.

In step 7, A, C and C1 are compared, and when A=C1, a backward-tilting proportional valve in the forklift is controlled to reduce an amount of oil supplied to the tilt cylinder, and the forklift starts to decelerate; and when A=C, the tilt cylinder reaches a maximum backward extending position, and the backward-tilting proportional valve cuts off an oil supply path to the tilt cylinder.

Figure 5:
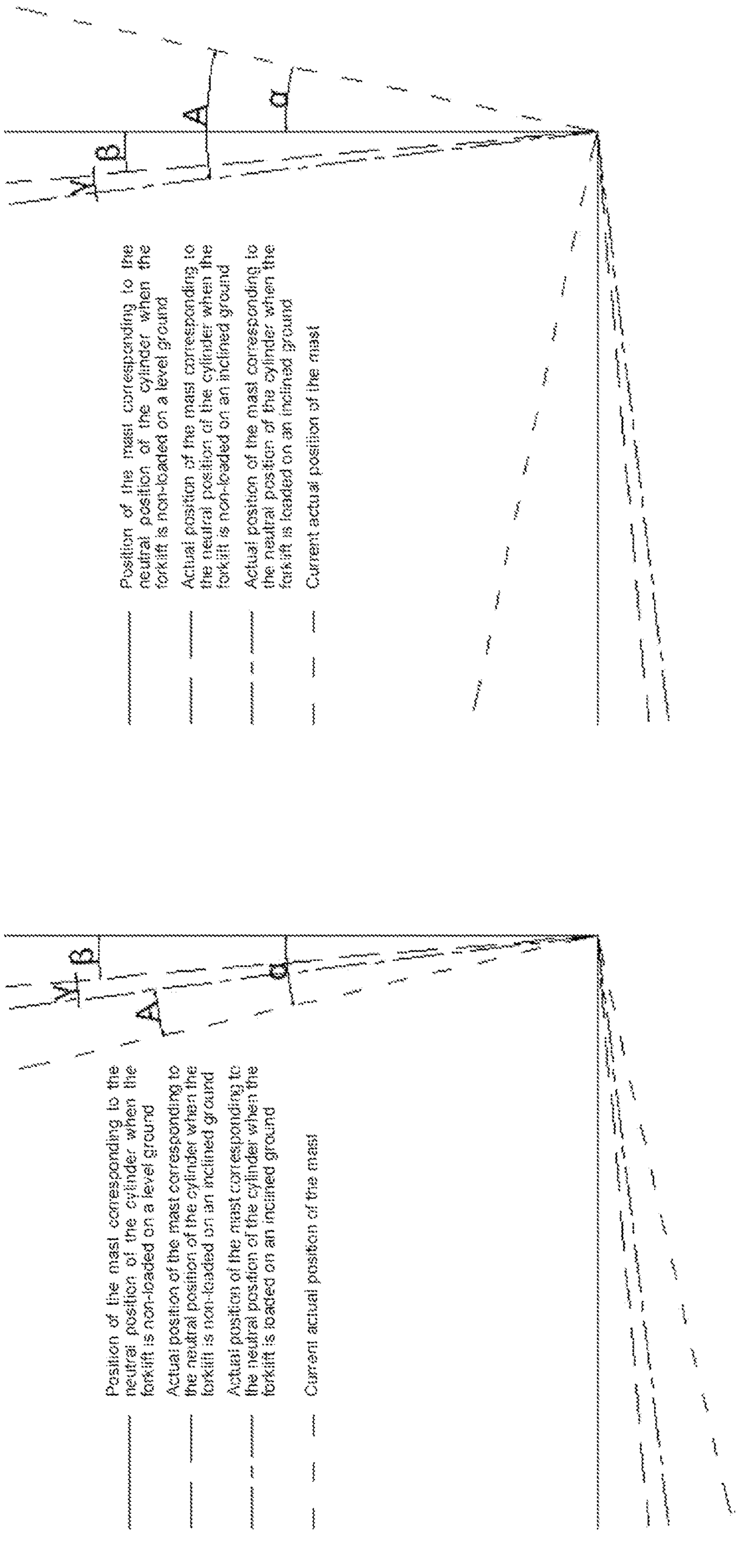
FIG. 5 is a schematic diagram of forward-tilting and backward-tilting angles when the ground is inclined and the forklift is heavily loaded.

Specifically, when the road surface is uneven and the mast of the forklift is deformed due to heavy load, as shown in FIG. 5, in the left figure, when the forklift tilts forward, $A=\alpha-\beta-\gamma$. Deceleration starts when A=B1, and deceleration stops when A=B. Thus a tilt forward up to a maximum forward extending position of the tilt cylinder can be achieved while realizing a buffering function, so that the forklift is fully utilized. In the right figure, in the case of backward tilting, the limit backward-tilting angle C is denoted as a negative value, $A=-(-\alpha+\beta-\gamma)=\alpha-\beta-\gamma$. Deceleration starts when A=C1, and the speed decreases to 0 when A=C. This enables the forklift to work upon a corresponding connection of the buffering angle with the actual deformation of the forklift and the ground slope/tilt angle, so as to really achieve a buffering effect.

Generally, the mast forward-tilting deceleration angle B1 is about 1° to 2° smaller than the limit forward-tilting angle B, and the mast backward-tilting deceleration angle C1 is about 1° to 2° smaller than the limit backward-tilting angle C. The mast forward-tilting deceleration angle B1 and the mast backward-tilting deceleration angle C1 may be set according to actual requirements.

The movement buffering control system and method for forklift tilt cylinder based on angle compensation according to the present invention may effectively solve the defect that the mast cannot tilt to a designed maximum angle dimension or move to a maximum position without timely buffering caused by the uneven ground and the deformation of the mast due to heavy load, has strong applicability, and can meet the requirements of various working conditions and working sites.

Although the specification is described according to the embodiments, an individual embodiment does not include only one independent technical solution. The description of the specification is merely for the sake of clarity, and those skilled in the art should take the specification as a whole, and individual technical solutions in the embodiments may also be appropriately combined to create other embodiments conceivable to those of ordinary skill in the art.

In the description of the present application, it should be noted that relational terms such as "first" and "second" may be used herein to distinguish one entity or operation from another entity or operation without necessarily requiring or implying any actual such relationship or order between such entities or operations. Moreover, the terms "include", "comprise" or any other variation thereof, are intended to cover a non-exclusive inclusion, such that a process, method, article, or device that includes a series of elements, does not include only those elements but may include other elements not expressly listed or inherent to such process, method, article, or device. Without further limitation, an element defined by the expression "including a/an . . . " does not exclude the presence of additional element(s) in the process, method, article, or device that includes the element.

In the description of the present application, it should be further noted that, unless specifically stated and limited, the terms "arrange" and "connect" should be understood in a broad sense, such as, a fixed connection, a detachable connection, or an integral connection; a mechanical connection or an electrical connection; a direct connection, an indirect connection through an intermediate medium, or an internal connection of two elements. For those of ordinary skill in the art, the specific meanings of the above terms in the present disclosure can be understood on a case-by-case basis.

Therefore, the above are only preferred embodiments of the present invention and are not intended to limit the implementation scope of the present application. All equivalent changes made in accordance with the scope of the claims in the present application fall within the protection scope of the claims of the present application.

What is claimed is:

1. A movement buffering control method for forklift tilt cylinder based on angle compensation, comprising the following steps:

step 1: when a forklift is non-loaded on a level ground, a telescopic position of a tilt cylinder, corresponding to a vertical mast, being a neutral position of the cylinder, acquiring a limit forward-tilting angle B and a limit backward-tilting angle C of the mast tilted forward and backward from a vertical state;

step 2: on the level ground, measuring and acquiring, by using a control variable method, a plurality of groups of mast deformation angles $\gamma$ caused by load, and statistically calculating a corresponding relationship between load weights and $\gamma$;

step 3: when the forklift operates, acquiring a current tilt angle $\alpha$ of the mast relative to a vertical plane, a current tilt angle $\beta$ of a vehicle body relative to the level ground and a current load weight on a fork in real time when the vehicle body operates on the ground;

step 4: calculating a tilt angle A of a current actual position of the mast with respect to the actual position of the mast currently corresponding to the neutral position of the cylinder in real time, $A=\alpha-\beta-\gamma$;

step 5: presetting a mast forward-tilting deceleration angle B1 and a mast backward-tilting deceleration angle C1, and judging whether the forklift is tilting forward or tilting backward: when the forklift is tilting forward, performing step 6; and when the forklift is tilting backward, performing step 7;

step 6: comparing A, B and B1, when A=B1, a forward-tilting proportional valve in the forklift being controlled to reduce an amount of oil supplied to the tilt cylinder;

and when A=B, the forward-tilting proportional valve cutting off an oil supply path to the tilt cylinder; and step 7: comparing A, C and C1, when A=C1, a backward-tilting proportional valve in the forklift being controlled to reduce an amount of oil supplied to the tilt cylinder; and when A=C, the backward-tilting proportional valve cutting off an oil supply path to the tilt cylinder.

2. The movement buffering control method for forklift tilt cylinder based on angle compensation according to claim 1, wherein the mast forward-tilting deceleration angle B1 is smaller than the limit forward-tilting angle B by 1° to 2°.

3. The movement buffering control method for forklift tilt cylinder based on angle compensation according to claim 1, wherein the mast backward-tilting deceleration angle C1 is smaller than the limit backward-tilting angle C by 1° to 2°.

* * * * *